(12) United States Patent
Kemper et al.

(10) Patent No.: US 8,857,148 B2
(45) Date of Patent: Oct. 14, 2014

(54) ELEMENT OF A CHAIN LINK OF AN ENERGY GUIDE CHAIN, PRODUCED BY MEANS OF A FLUID INTERNAL PRESSURE INJECTION MOLDING PROCESS

(75) Inventors: Uwe Kemper, Kreuztal (DE); Heiner Samen, Marienheide (DE); Jochen Bensberg, Hilchenbach (DE); Thomas Wendig, Katzwinkel (DE)

(73) Assignee: Tsubaki Kabelschlepp GmbH, Wenden-Gerlingen (DE)

( * ) Notice: Subject to any disclaimer, the term of this patent is extended or adjusted under 35 U.S.C. 154(b) by 201 days.

(21) Appl. No.: 13/380,670

(22) PCT Filed: Jun. 8, 2010

(86) PCT No.: PCT/EP2010/057963
§ 371 (c)(1),
(2), (4) Date: Mar. 7, 2012

(87) PCT Pub. No.: WO2010/149485
PCT Pub. Date: Dec. 29, 2010

(65) Prior Publication Data
US 2012/0167541 A1     Jul. 5, 2012

(30) Foreign Application Priority Data
Jun. 26, 2009   (DE) .................... 10 2009 030 857

(51) Int. Cl.
*F16G 13/00*   (2006.01)
*H02G 11/00*   (2006.01)
*B29C 45/17*   (2006.01)
*F16G 13/16*   (2006.01)
*H02G 3/04*    (2006.01)

(52) U.S. Cl.
CPC .............. *F16G 13/16* (2013.01); *H02G 11/006* (2013.01); *B29C 45/1706* (2013.01); *H02G 3/0475* (2013.01); *Y10S 59/90* (2013.01)
USPC ................... 59/78.1; 59/900; 248/49; 248/51

(58) Field of Classification Search
CPC ................................ F16G 13/16; H02G 11/006
USPC ............................... 59/78.1, 900; 248/49, 51
See application file for complete search history.

(56) References Cited

U.S. PATENT DOCUMENTS

| | | | |
|---|---|---|---|
| 4,129,635 A * | 12/1978 | Yasuike et al. | 264/45.5 |
| 5,996,330 A * | 12/1999 | Ehmann et al. | 59/78.1 |
| 7,650,743 B2 * | 1/2010 | Wehler et al. | 59/78.1 |
| 7,882,690 B2 * | 2/2011 | Nehring et al. | 59/78.1 |
| 8,397,479 B2 * | 3/2013 | Wendig et al. | 59/78.1 |
| 2005/0236745 A1 | 10/2005 | Lang et al. | |

FOREIGN PATENT DOCUMENTS

| | | |
|---|---|---|
| DE | 4202306 A1 | 8/1992 |
| DE | 4412977 A1 | 12/1994 |
| DE | 20002500 | 5/2000 |
| DE | 10018905 A1 | 10/2001 |
| DE | 10142349 A1 | 3/2003 |
| DE | 102005000842 A1 | 7/2005 |

(Continued)

*Primary Examiner* — David B Jones
(74) *Attorney, Agent, or Firm* — BainwoodHuang (57) ABSTRACT

Component of a chain element of an energy-conducting chain, wherein the component has a cavity which is produced by means of a fluid internal pressure injection molding method, or is formed from a micro-cellular foam.

7 Claims, 6 Drawing Sheets

(56) References Cited

FOREIGN PATENT DOCUMENTS

| | | |
|---|---|---|
| DE | 102004004237 A1 | 8/2005 |
| DE | 102006041580 A1 | 3/2007 |
| DE | 102005049919 A1 | 4/2007 |
| DE | 202008013562 U1 | 1/2009 |
| EP | 0396728 B2 | 11/1990 |
| EP | 0822353 A2 | 2/1998 |
| JP | 2006213041 A | 8/2006 |
| JP | 2006224371 A | 8/2006 |
| JP | 2007536480 A | 12/2007 |
| JP | 2008037007 A | 2/2008 |
| WO | 9831521 A2 | 7/1998 |
| WO | 2005113214 A1 | 12/2005 |

* cited by examiner

ELEMENT OF A CHAIN LINK OF AN ENERGY GUIDE CHAIN, PRODUCED BY MEANS OF A FLUID INTERNAL PRESSURE INJECTION MOLDING PROCESS

The invention relates to an element of a chain link of an energy guide chain, wherein the element is made of a plastic and provided on a chain link of an energy guide chain, and is formed by the following elements: link plates, at least one transverse web, and/or a cover.

Energy guide chains are used for guiding cables, lines, hoses, or the like between a stationary and a movable attachment point. The energy guide chain is formed by a plurality of chain links which are connected to one another in an articulated manner. Each chain link has two link plates. The plates are connected to one another by at least one transverse web or a cover. The link plates and the transverse webs form a channel in which the hoses, cables, lines, or the like are situated.

Chain links are known in which the transverse webs or the covers are detachably connected to the link plates. The width of an energy guide chain may be adapted to the requirements by using or providing transverse webs or covers having different lengths.

Chain links are also known in which a transverse web or a cover is connected to the link plates so that the latter form a U-shaped body. A further transverse web or cover is detachably connected to at least one plate, so that lines may be inserted into or removed from the chain link by opening the transverse web or cover.

Chain links are known which are made of a metallic material. Furthermore, chain links are known which are made of at least one plastic. Additives, in particular glass fibers, are mixed in with the plastic to improve the mechanical properties of a plastic chain link.

Maintaining tolerances in the production of plastic chain links or the individual elements of a plastic chain link is not without problems, since uniform cooling of the chain link or parts of the chain link cannot be ensured on account of material accumulation, for example for plastic plates or in the connecting regions between plastic plates and the transverse web in two U-shaped bodies. Furthermore, the elements of a chain link may be hydrophilic, which may also adversely affect the tolerances as a function of the water absorption.

On this basis, the object of the present invention is to provide a dimensionally stable and more precise element of a chain link.

This object is achieved according to the invention by means of an element of a chain link of an energy guide chain, wherein the element is made of a plastic, having features disclosed herein. Advantageous refinements and embodiments of the element are disclosed herein as well.

The element according to the invention of a chain link of an energy guide chain, wherein the element is made of a plastic, is characterized in that the element has a cavity which is produced by means of a fluid internal pressure injection molding process.

The properties of the element are changed in a positive way by forming a cavity inside the element of a chain link according to the fluid internal pressure injection molding process. The element per se is a lightweight element, since little material is used. This also has an economic advantage. As a result of the element having a cavity, the cooling behavior of the element is positively influenced, and greater dimensional stability, and therefore a higher rate of tolerance compliance, is achieved. If the element is made of a hydrophilic plastic, as the result of providing the cavity a smaller quantity of liquid is absorbed by the plastic, thus also ensuring improved tolerance compliance.

The cavity is produced by means of a fluid internal pressure injection molding process. The fluid may be a gas or a gas mixture. The use of an inert gas, in particular nitrogen, is preferred.

According to another advantageous embodiment, it is proposed that the cavity is produced in the element by means of a fluid internal pressure injection molding process in which a liquid or a liquid mixture is used as the fluid. The liquid may be water. When a liquid is used as the fluid, the cooling behavior is also influenced in a positive way. According to yet another advantageous embodiment, it is proposed that the fluid contains a gas or a gas mixture and a liquid or a liquid mixture. The gas and the liquid may be introduced into a cavity one after the other, or at the same time. The cavity is the cavity in the injection mold, into which the plastic material is introduced first. The fluid may be subsequently introduced into the cavity. The introduction may be carried out by injection. For this purpose, the machine may have an appropriate nozzle, so that the fluid is introduced into the cavity via the gating system. There is also the option for the mold in which the cavity is formed to have appropriate injection nozzles at specified locations. Combinations of these embodiments are also possible.

The cavity in the element may also be produced by first completely filling the cavity with the melt. A portion of the melt is subsequently displaced into a secondary cavity, or back into the gating system, by the fluid.

The stability of the element may be advantageously influenced by targeted formation of the cavity.

The fluid is preferably introduced into the cavity at a pressure between 50 and 500 bar.

One embodiment is preferred in which the fluid is introduced into the cavity at a temperature between −150 and 150° C.

The element is preferably selected from the following group: link plate, transverse web, cover, or separating web.

According to a further concept of the invention, it is proposed that the plastic element of a chain link of an energy guide chain is made of a microcellular foam. The microcellular foam preferably has a uniform cell structure having small void spaces. The void spaces are preferably smaller than 100 μm. Alternatively, the element may be made of an integral foam. In such an element the density preferably decreases continuously from the outside toward the inside. The element has a porous, preferably microcellular, core, and a solid edge region. The element made of an integral foam may be produced by reaction injection molding. For this purpose, the reaction mixture to be foamed is introduced in liquid form into a cold mold, so that it completely fills the mold after the foaming reaction has concluded. The temperature gradient causes different rates of expansion of an evaporating blowing agent over the cross section of the mold, resulting in a difference in density.

The element of a chain link is preferably glass fiber-reinforced. The presence of glass fibers promotes the formation of the microcellular foam. The glass fibers may form a nucleation agent. A blowing agent is injected into the polymer melt, and dissolves in the polymer melt at high temperature and high pressure. The blowing agent forms a single-phase solution with the melt. This results in a very large number of small cells which grow simultaneously and to the same extent when the blowing agent begins to diffuse. Upon injection into the cavity, the pressure drops abruptly, the blowing agent is intensely supersaturated in the polymer, and the form formation begins. The rate of the pressure drop is very high, since a slow drop in pressure results in formation of large void spaces.

Thus, the foam may be formed by physical or chemical foaming, as described above. For chemical foaming, a blowing agent in the form of powder or granules is added to the plastic, and reacts, with the evolution of gas.

According to another concept of the invention, a chain link in an energy guide chain is proposed which is formed by the following elements: link plates, at least one transverse web, and/or a cover, wherein at least one element has a cavity that is produced by means of a fluid internal pressure injection molding process.

According to yet another concept of the invention, a chain link of an energy guide chain is formed by the following elements: link plates, at least one transverse web, or a cover. This concept is characterized in that at least one element is made of a microcellular foam. The at least one element is preferably made of an integral foam.

The element may be produced by physical or chemical foaming.

Further advantages and particulars of the invention are explained with respect to the exemplary embodiments illustrated in the drawings, without limiting the subject matter of the invention to these specific exemplary embodiments. It is pointed out that the various features described herein as well as particulars of the description of the exemplary embodiments may be combined with one another in any given, technologically meaningful manner to provide further embodiments of the invention.

Figure 1:
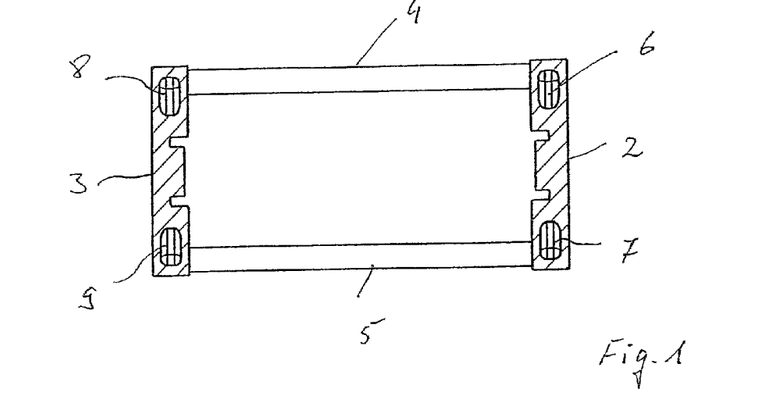
FIG. 1: shows a cross section of a chain link.

FIG. 1 shows one exemplary embodiment of a chain link by way of example. The chain link 1 is formed by two link plates 2, 3. The link plates 2, 3 are separated at a distance from one another, and are connected to transverse webs 4, 5. The transverse webs 4, 5 may be detachably connected to the link plates 2, 3.

It is apparent from the illustration according to FIG. 1 that the link plates 2, 3 have cavities 6, 7 and 8, 9, respectively. The cavities 6 through 9 are produced by means of a fluid internal pressure injection molding process.

Figure 2:
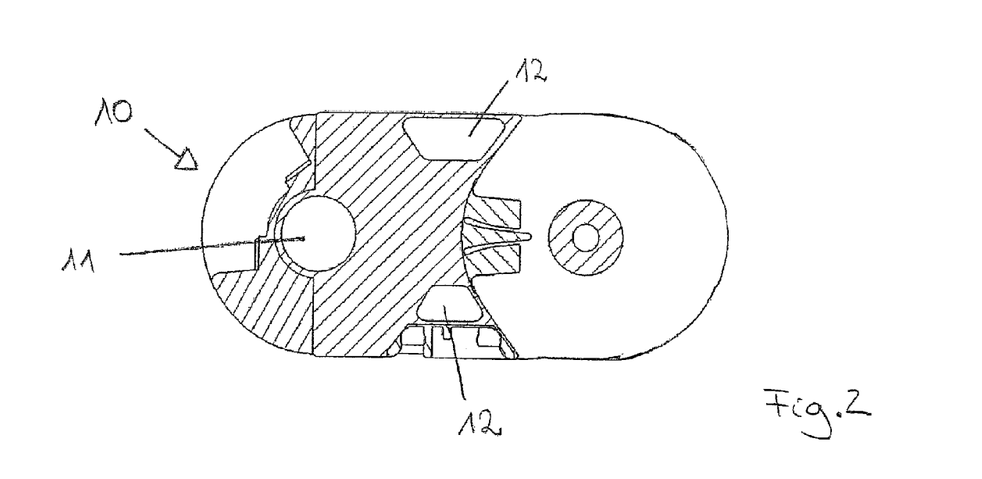
FIG. 2: shows a plate of a chain link in a sectional view.

FIG. 2 shows a link plate 10. The link plate 10 has a first region in which an articulated pin is formed. An articulated receptacle 11 is provided in a second region situated opposite from the first region. The articulated receptacle and the articulated pin are designed in such a way that link plates of adjacent chain links may be connected to one another in an articulated manner. The articulated pins engage with the corresponding articulated receptacles in the link plates of an adjacent link.

To limit the pivoting motion of two adjacent chain links, stop surfaces which cooperate with one another are provided in the regions.

It is apparent from FIG. 2 that the link plate 10 has a cavity 12. The link plate 10 may have multiple cavities which are provided independently of one another. The cavity is produced by means of a fluid internal pressure injection molding process.

Figure 3:
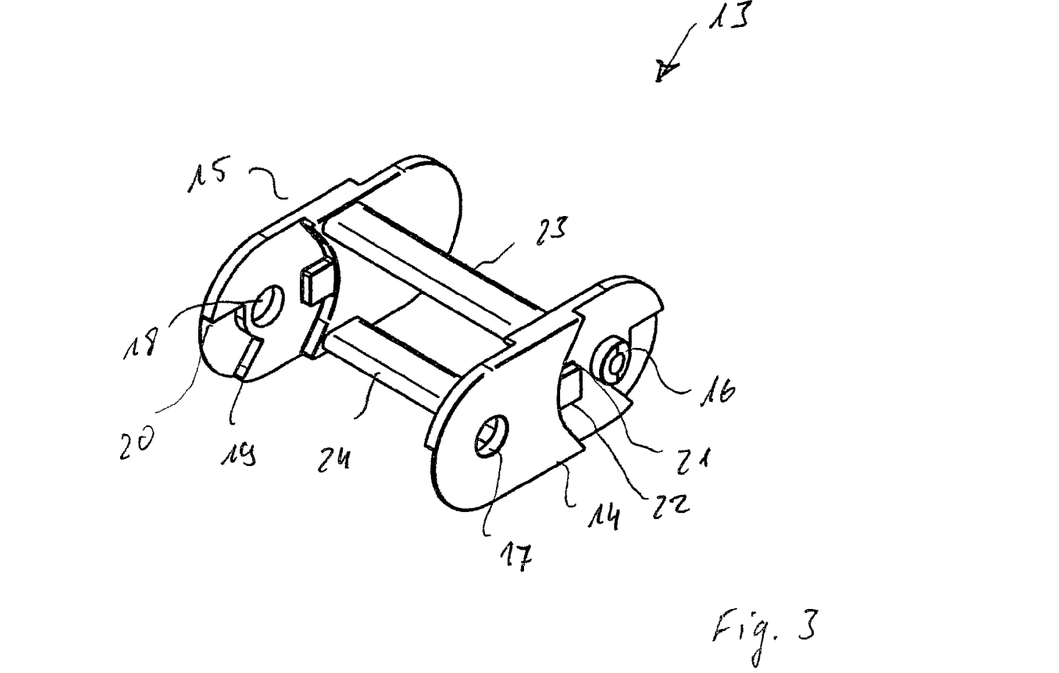
FIG. 3: shows a perspective view of one exemplary embodiment of a chain link.
Figure 4:
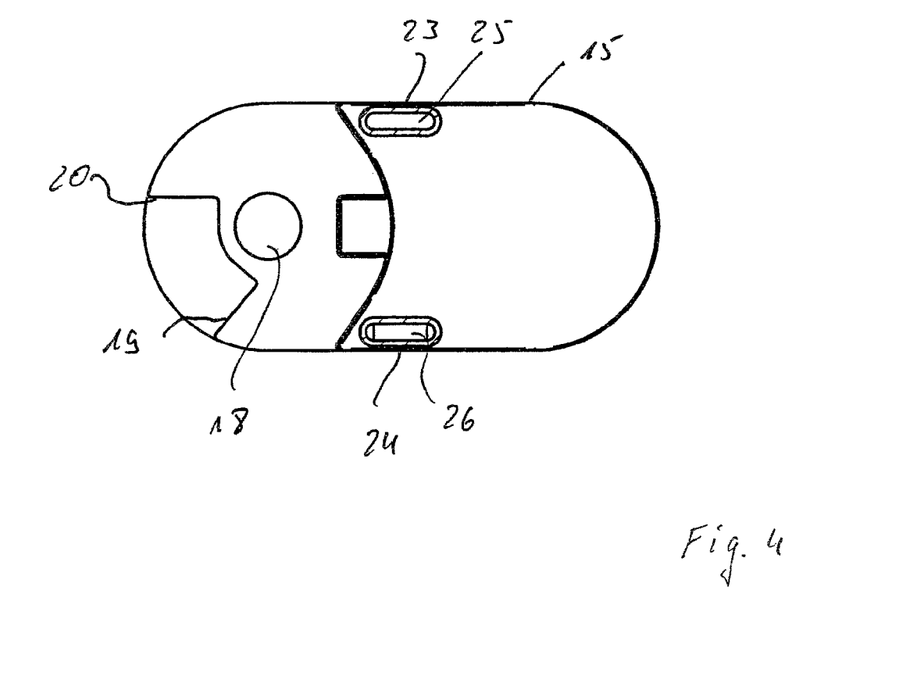
FIG. 4: shows the chain link corresponding to FIG. 3 in cross section.

FIG. 3 shows one exemplary embodiment of a chain link 13. The chain link 13 is formed by two link plates 14, 15. Each link plate 14, 15 has an articulated pin 16. In addition, each link plate 14, 15 has an articulated receptacle 17, 18, respectively. The pivoting motion of two adjacent chain links is limited by stop surfaces 19, 20, 21, and 22. The link plates 14, 15 are connected by transverse webs 23, 24. The chain link 13 is formed in one piece. It is apparent from the sectional illustration according to FIG. 4 that the transverse webs 23, 24 have cavities 25, 26, respectively. The cavities 25, 26 preferably extend over the entire length of the transverse webs 23, 24, respectively. The cavities 25, 26 are formed by means of a fluid internal pressure injection molding process.

Figure 5:
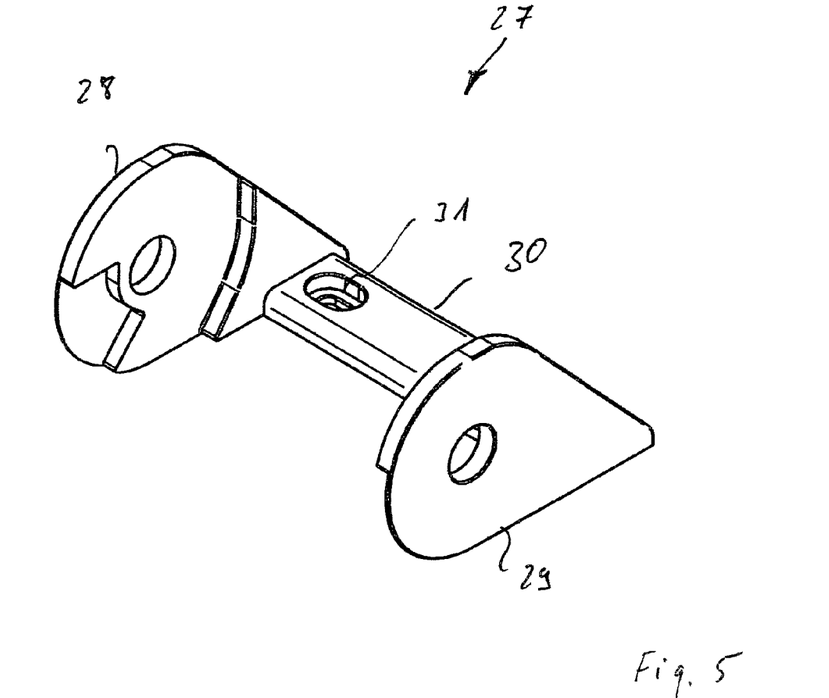
FIG. 5: shows a perspective view of a terminal chain link.

The energy guide chain has a terminal chain link for fixing the energy guide chain to a stationary or a movable attachment point. One exemplary embodiment of a terminal chain link is illustrated in FIG. 5. The terminal chain link 27 has link plates 28, 29 which are provided with corresponding articulated receptacles. The link plates 28, 29 are connected to one another via a transverse web 30. The terminal chain link in the illustrated exemplary embodiment has a one-piece design. For fixing the terminal chain link to a surface of a movable or stationary connecting region, openings 31 are provided in the transverse web 30 which extend transversely with respect to the longitudinal direction of the transverse web.

Figure 6:
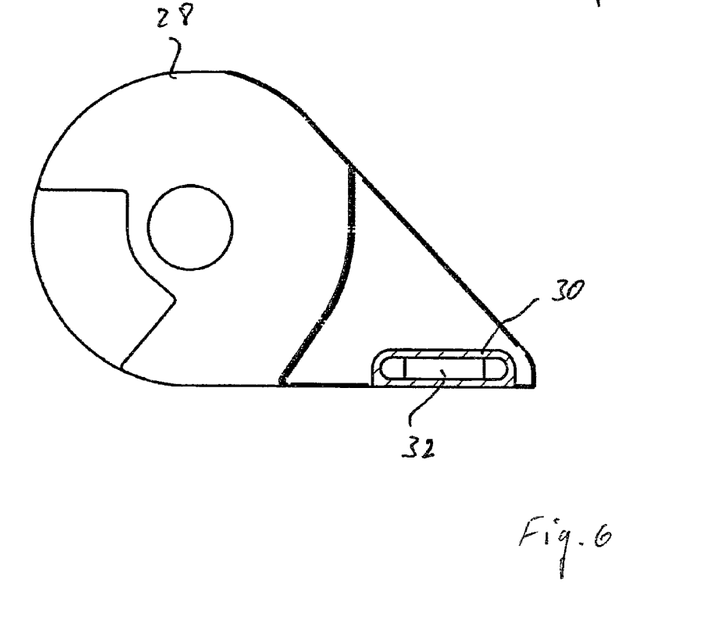
FIG. 6: shows the terminal chain link in cross section.
Figure 7:
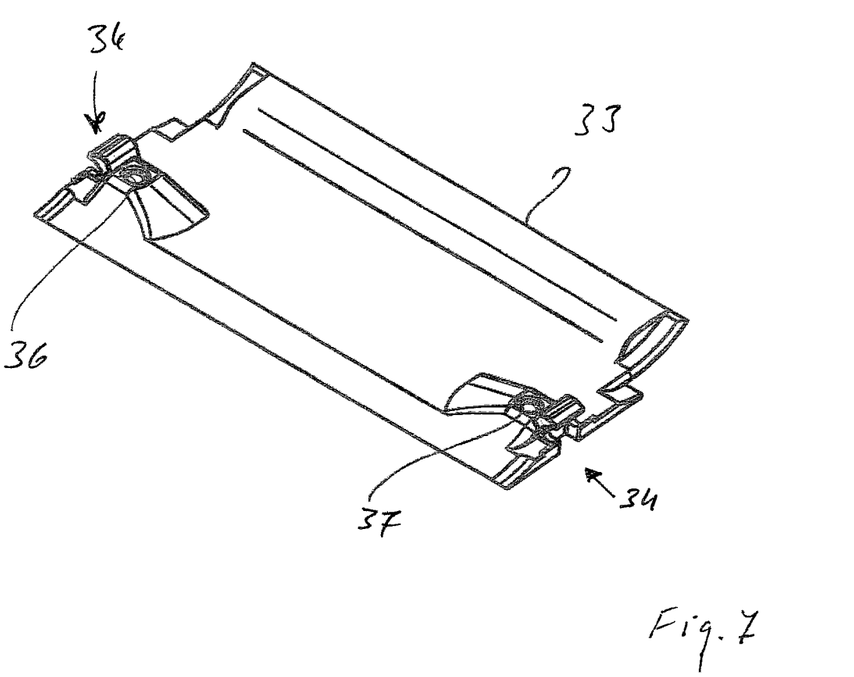
FIG. 7: shows a perspective view of a cover from below.
Figure 8:
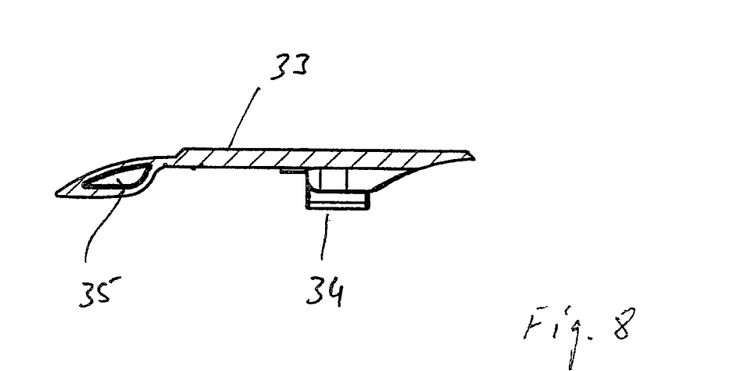
FIG. 8: shows the cover corresponding to FIG. 7 in cross section.

It is apparent from the illustration according to FIG. 6 that the transverse web is hollow inside. The cavity is formed inside the transverse web 30 by means of a fluid internal pressure injection molding process. To protect lines, hoses, cables, or the like inside an energy guide chain, the chain links may be provided with covers, thus forming an essentially closed channel. One exemplary embodiment of a cover is illustrated in FIG. 7. At its edges the cover 33 has means 34 that are suitable and intended for cooperating with the link plates of a chain link, not illustrated, so that a preferably detachable connection results between the link plates and the cover 33. The cover 33 has a cavity 35. The cavity 35 is formed by means of a fluid internal pressure injection molding process. Nozzles are provided for introducing a fluid into the melt which is present in the cavity in an injection mold for forming the cover 33. The corresponding inlet openings 36, 37 which open into the cavity 35 are illustrated in FIG. 7.

Figure 9:
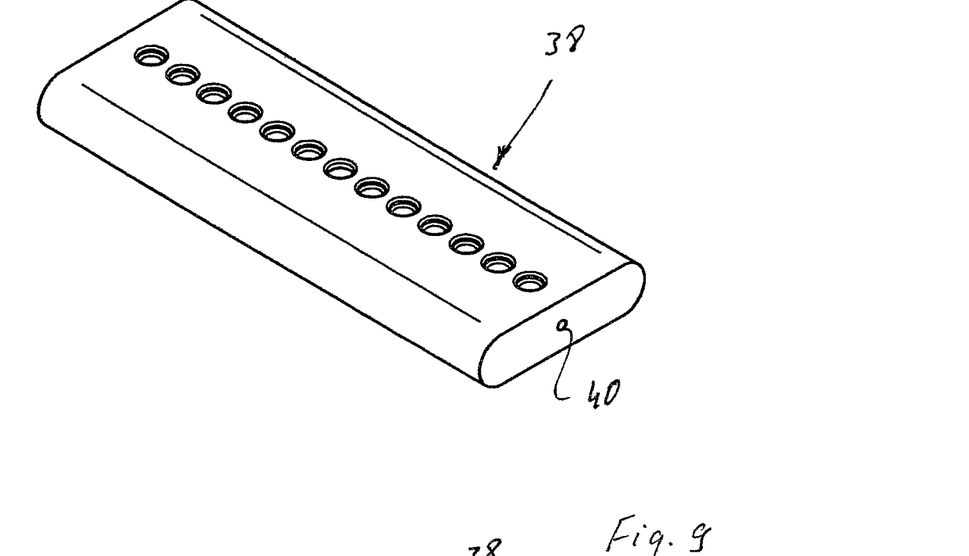
FIG. 9: shows a perspective view of a separating web.
Figure 10:
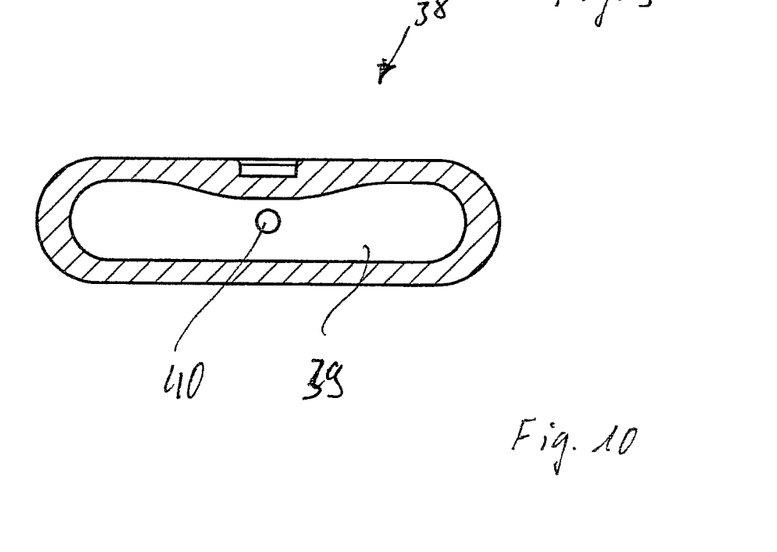
FIG. 10: shows the separating web corresponding to FIG. 9 in cross section.
Figure 11:
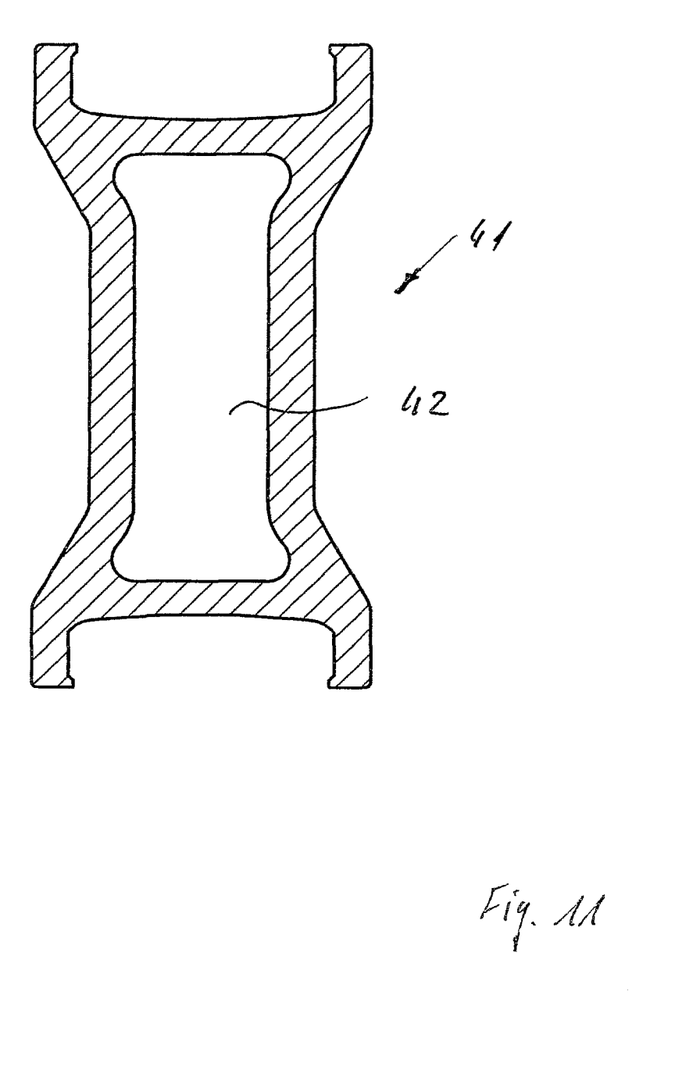
FIG. 11: shows a cross section of another exemplary embodiment of a separating web.

FIGS. 9 through 11 show various embodiments of separating webs. Such separating webs are used to subdivide the channel cross section of an energy guide chain. The separating web 38 has a cavity 39, as is apparent from FIG. 10. Reference numeral 40 denotes the openings through which a fluid passes into the separating web when the separating web 38 is produced according to a fluid internal pressure injection molding process.

FIG. 11 shows another embodiment of a separating web which is suitable for subdividing a channel cross section. The transverse web has fork-shaped end regions which are used for connecting to a transverse web. The separating web 41 has a cavity 42 which is produced by means of a fluid internal pressure injection molding process.

As a result of the elements of a chain link which are produced according to the invention, the mass of the chain links is reduced while maintaining the stability, so that the intrinsic weight of the chain may be reduced. This also has the advantage that greater line weights may be introduced into the chain.

LIST OF REFERENCE NUMERALS

1 Chain link
2, 3 Link plate
4, 5 Transverse web
6-9 Cavity
10 Link plate
11 Articulated receptacle
12 Cavity
13 Chain link
14, 15 Link plate
16 Articulated pin
17, 18 Articulated receptacle
19-22 Stop surfaces
23, 24 Transverse web
25, 26 Cavity
27 Terminal chain link
28, 29 Link plates
30 Transverse web
31 Opening
32 Cavity
33 Cover
34 Means
35 Cavity
36, 37 Opening
38 Separating web
39 Cavity
40 Opening
41 Separating web
42 Cavity

The invention claimed is:

1. Element of a chain link of an energy guide chain, wherein the element is made of a plastic, and wherein the element is made of a microcellular foam.

2. Element according to claim 1, wherein the element is formed from an integral foam.

3. Element according to claim 1, wherein the element is formed by physical or chemical foaming.

4. Element according to claim 1, wherein the element is selected from the following group: link plate, transverse web, cover, separating web.

5. Chain link of an energy guide chain formed by the following elements: link plates, at least one transverse web, and/or a cover, wherein at least one element is formed from a microcellular foam.

6. Chain link according to claim 5, wherein the at least one element is formed from an integral foam.

7. Chain link according to claim 5 wherein the at least one element is formed by physical or chemical foaming.

* * * * *